Oct. 26, 1965  J. B. KNUDSEN  3,214,160
APPARATUS FOR DECOLLATING ZIGZAG FOLDED MULTI-PLY WEBS
Filed July 1, 1963  4 Sheets-Sheet 1
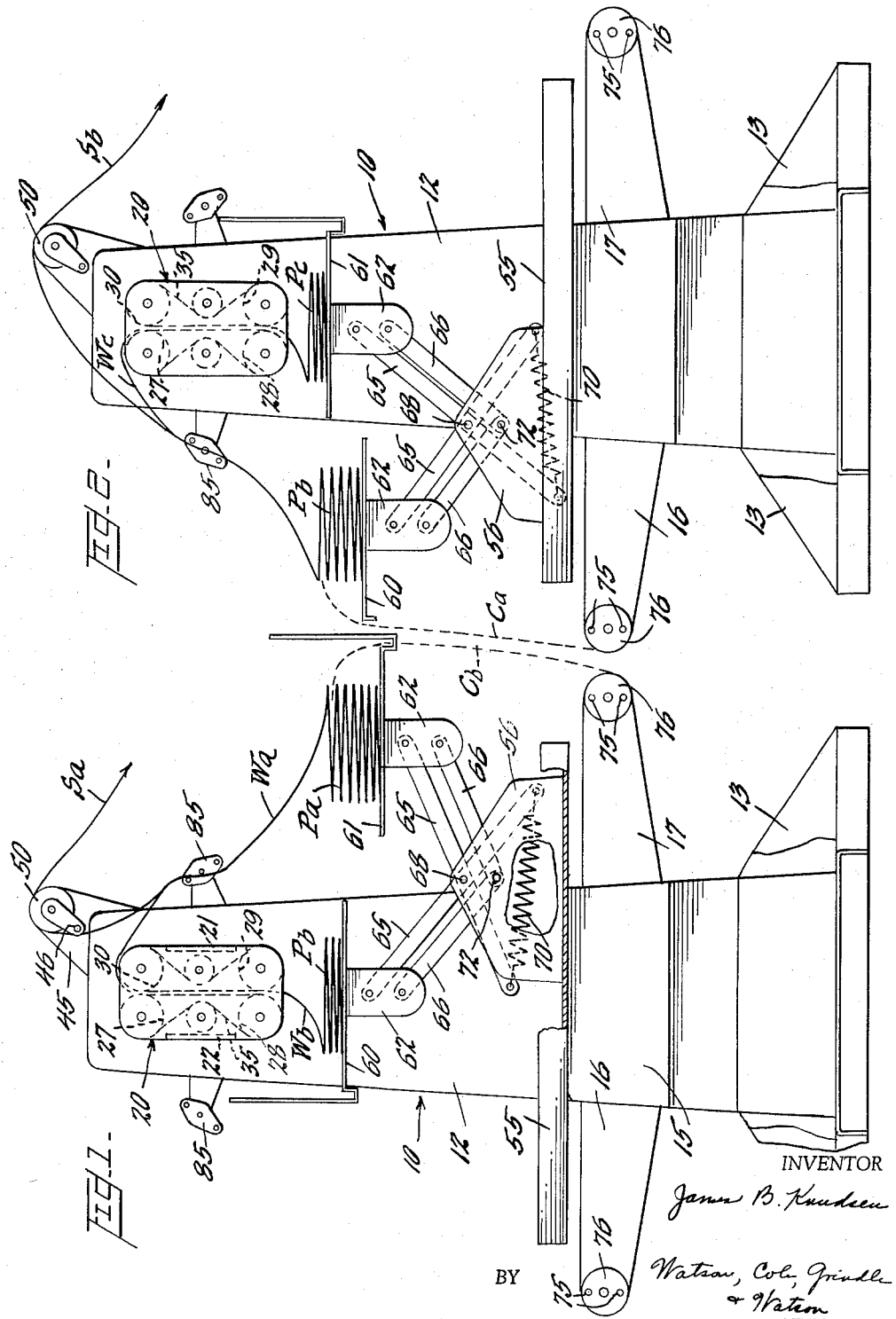
INVENTOR
James B. Knudsen
BY Watson, Cole, Grindle & Watson
ATTORNEY

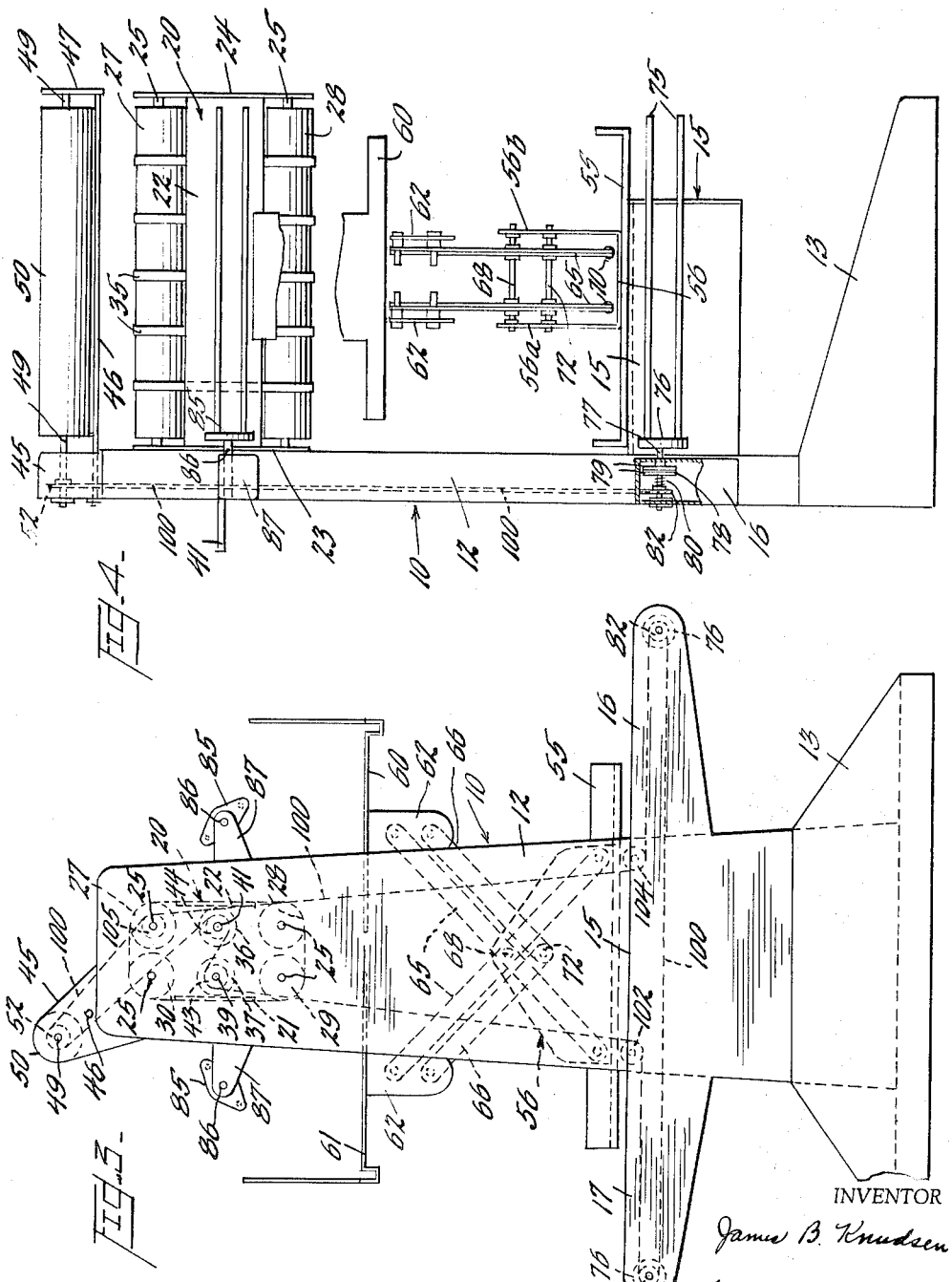

Oct. 26, 1965 J. B. KNUDSEN 3,214,160
APPARATUS FOR DECOLLATING ZIGZAG FOLDED MULTI-PLY WEBS
Filed July 1, 1963 4 Sheets-Sheet 3
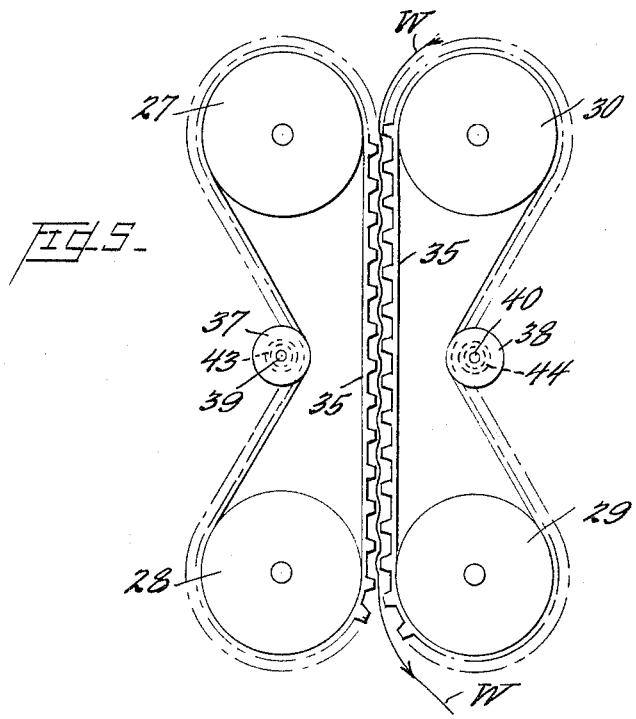
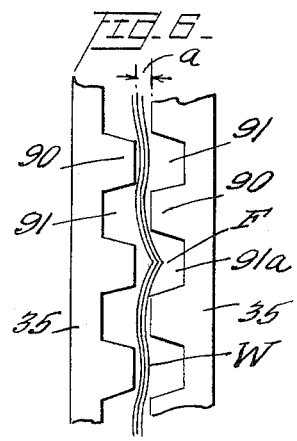
INVENTOR
James B. Knudsen
BY Watson, Cole, Grindle & Watson
ATTORNEYS

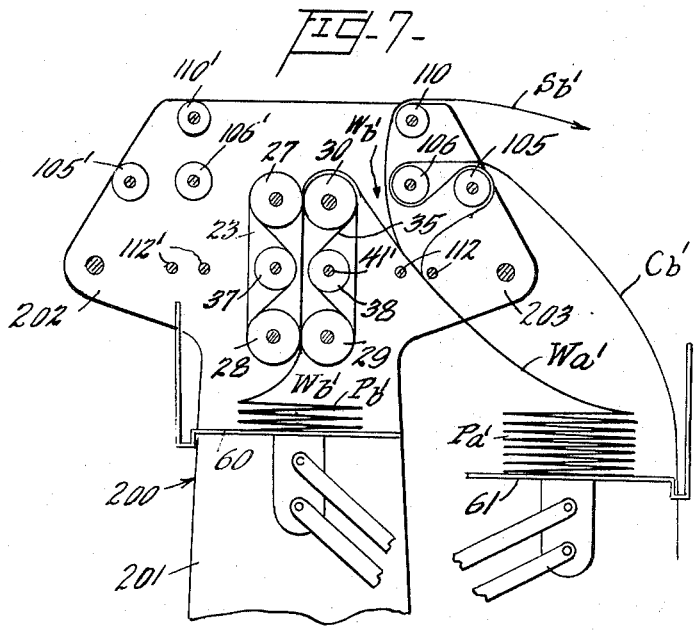
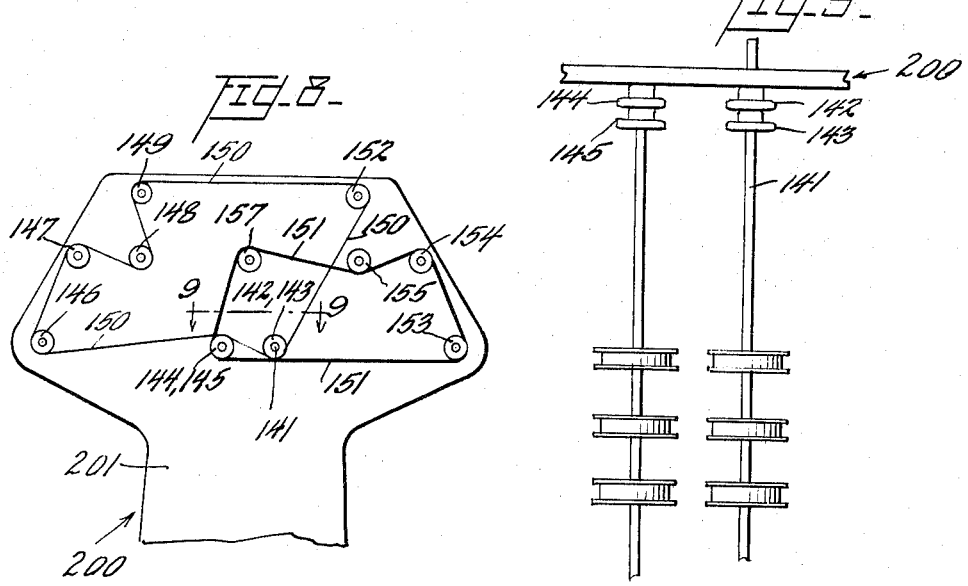

United States Patent Office 3,214,160
Patented Oct. 26, 1965

3,214,160
APPARATUS FOR DECOLLATING ZIGZAG
FOLDED MULTI-PLY WEBS
James B. Knudsen, Lewiston, N.Y., assignor to Moore
Business Forms, Inc., Niagara Falls, N.Y., a corporation of Delaware
Filed July 1, 1963, Ser. No. 291,838
10 Claims. (Cl. 270—52.5)

This invention relates to decollating machines and more particularly to machines for separating individual transfer strips or record strips from a continuous multi-ply web of interfolded transfer and record strips, and restoring the remainder of the multi-ply web to zigzag pack formation.

Devices in use at the present time to decollate and re-fold webs of continuous business forms, for the most part, utilize gravity folding either with or without a driven roller; and they are all limited in speed and reliability for unattended operation. Production equipment folders particularly employ a complex system of swing-chutes or spiral devices which require precise timing, and this elaborate type of machine is not practical for use in an ordinary business office.

These prior devices also require frequent repositioning of the forms pack, since the operating characteristics change radically when form sizes or weights of paper are changed.

In its preferred embodiments, the invention contemplates the provision of a supporting pedestal or pillar having a readily shiftable stand comprising two trays positioned to serve alternately as feeding and receiving means for the original and depleted packs, the stand being movable to dispose the immediate receiving pack centered beneath the novel down-feed belt device, which itself constitues an important element of the inventive concept.

The down-feed device comprises a series of rolls, some of which may be driven and other idling, over which are trained mutually confronting runs of conveyor belts having notched faces, the alternate notches and transverse ribs between the notches on the respective belts resembling the teeth of a rack or gear. The teeth and spaces therebetween on the two belts are disposed alternately opposite each other to provide a novel frictional-drive spacing for the creased or zigzag folded continuous form webs.

The arrangement is such that the webs being fed are not ironed out by the spaced belts but retain their "tent" configuration at the creases or fold lines, and these tents nest in the grooves of the belts and, induced by the tractor-like action of the staggered lugs or ribs, provide a feeding action which keeps the fold perforations and thus the successive multiple forms in register.

Among the features of novelty of the invention may be mentioned the following: (a) the folding of the webs is symmetrical about a vertical center line; (b) there is no sliding of one paper surface upon another; (c) all parts are in perfect register at the re-fold point; (d) the folds tend to follow the belts in the right direction for a particular fold; and (e) because the folds are started on a curved surface there is no tendency to straighten, kink, crease, or otherwise stiffen the paper.

Other objects and features of novelty, including alternative means for removing the transfer or carbon strips from the web, will be apparent from the following specification when read in connection with the accompanying drawings in which one embodiment of the invention is illustrated by way of example.

In the drawings:

FIGURE 1 is a view in front elevation of a device embodying the principles of the invention, the parts being arranged for the feed of webs from a pile at the right-hand side of the machine;

FIGURE 2 is a similar view of the device, the parts being adjusted for feeding from the opposite side;

FIGURE 3 is a somewhat diagrammatic view in rear elevation of the device, tracing the drive for the feeding members;

FIGURE 4 is a view in side elevation as seen from the right-hand side of FIGURE 3;

FIGURE 5 is a detail view in elevation of the belt installation feed mechanism which comprises in itself an important novel aspect of the invention; some of the pulleys or sprockets being of slightly variant dimensions;

FIGURE 6 is a fragmentary view in elevation on an enlarged scale showing the relationship of the teeth of the cooperating belts and the folds in the continuous form multi-ply web;

FIGURE 7 is a fragmentary somewhat diagrammatic front view of an alternative embodiment of the invention;

FIGURE 8 is a schematic view similar to FIGURE 3 showing a modified driving system for application to the embodiment shown in FIGURE 7; and FIGURE 9 is a fragmentary detail sectional view taken on line 9—9 of FIGURE 8.

Since FIGURES 1 and 2 are views showing the device adjusted for operation for alternate runs of the decollator, reference to FIGURE 3 is made for an understanding of the symmetrical disposition of the parts as in idle position, wherein the supporting devices are centralized with regard to the main frame.

The main frame or pedestal of the device is given the general reference numeral 10 and will be seen to comprise a vertical pillar member 12 occuping a rearward position in the device, and supported by a base structure 13 which extends forwardly beneath the operative mechanism. A main shelf or table 15 protrudes from the pillar 12 and projecting laterally from each side of the shelf 15 are the bracket arms 16 and 17.

Near the top of the device a frame or housing 20 is secured to the face of the pillar 12 and projects forwardly above the shelf or table 15. This housing or bracket frame 20 comprises two side walls 21, 22, a rear wall 23 and a front wall or panel 24, all secured together to form a rigid supporting structure for the principal down-feed mechanism.

Supported in appropriate bearings (not shown) formed in the front and rear plates 24 and 23 are the shafts 25 of four cylindrical rolls which serve as pulleys for the feeding belts. These rolls are designated 27, 28, 29 and 30 and carry one or more pairs of feeding belts 35, the peculiar novel details and configuration of which will be described presently. As shown in the drawings, most clearly in FIGURE 5, there is also provided intermediately disposed pulleys around which remote runs of the belts are trained. These pulleys are designated 37 and 38 in the drawings and are mounted on shafts 39 and 40 which have suitable bearings in the front and rear plates of the frame 20. As one suggested means for driving the belts 35 and indeed for actuating the other operative parts of the machine, the shaft 40 may be extended as at 41 in FIGURE 4 for the application of a driving pulley or other suitable operative connections to a source of power.

Upon the shafts 39 and 40 within the hollow pillar structure 12 are fixed the sprockets 43 and 44 about which drive chains may be trained as will be described later on which reference to FIGURE 5.

Projecting at an angle from the upper end of the pillar 12 is a bracket 45 from which extends a rod 46 to the forward end of which is fixed a bearing bracket 47. Between the part 45 and the bracket 47 and having bearings in each of these structures is the shaft 49 of the guide roller 50. The rearward end of the shaft or axle 49 is provided with a sprocket 52 for the main drive chain.

Supported upon the table or bench 15 is a tray 55 within which is disposed a U-shaped sheet metal base or stand 56 having upright walls 56a and 56b.

Two pairs of lazy-tong parallel motion supporting arms are fulcrumed between the vertical plates or walls 56a and 56b of the bracket in order to support two pile boards or pack carrier shelves 60 and 61. Depending from the shelves 60 and 61 are spaced vertical plates 62 for the attachment of the supporting arms. Four sets of these arms are provided, two on each side of the center line of the device and each pair consisting of a longer arm 65 and a shorter arm 66. The arms 65 are provided to an upward portion of the plates 62 depending from the pile boards or shelves 60 and 61 and are pivoted to the side walls 56a and 56b of the U-shaped frame 56 at an intermediate point 68. The lower ends of these elongated arms 65 are conected by means of tension springs 70 which serve to urge their lower ends toward each other and consequently to urge the trays or shelves 60 and 61 upwardly counterbalancing the weight of the form packs on these shelves.

The shorter arms 66 have their lower ends pivoted to appropriate bolts or cross bars 72 supported by the base frame 56. The base frame or stand 56 of the pack receiving and dispensing installation is shiftable in the tray or pan 55 from one side of the machine to the other in order to bring one or the other of the shelves or pack supporting boards 60 or 61 beneath the central portion of the down-feed belt installation. In the set-up illustrated in FIGURE 1 of the drawings, the left-hand shelf 60 is serving as the receiving shelf or tray and the right-hand shelf 61 contains the pack from the continuous form web Wa is being fed.

Supported for rotation at the ends of the arms 16 and 17 of the pedestal are the re-wind forks or reels 75. These forks comprise two bars each having an end fixed in a circular plate 76 as shown in FIGURE 4, which plate is carried upon a shaft 77 which is frictionally driven through a clutch mechanism 78 of any appropriate construction, for example, including plates 79 urged into frictional engagement by a coil spring 80. The driving portion of the shaft has bearings within the pillar 12 and carries a sprocket wheel 82 about which the main driving chain is trained.

Web guiding means are provided upon each side of the machine at the upper portion thereof and these comprise fork-like structures 85 carried upon a rod 86 adjustably supported in the brackets 87.

From the live sprocket 44 carried by the shaft extension 41, a drive chain 100 extends diagonally and around the sprocket 43 which drives the roller 37. Thence the chain 100 passes downwardly and around the guide sprocket 102 and outwardly around one of the sprockets 82 carried upon the shaft 77 which frictionally drives one of the wind-up devices 75. The chain 100 then extends all the way across the machine to the companion sprocket 82 which drives the wind-up fork 75 at that side of the machine. The chain then continues around the guide sprocket 104 and thence upwardly around a sprocket 105 carried upon the shaft 25 which drives the roller 27. From there the chain 100 passes around the sprocket 52 carried upon the shaft 49 of the guide roller 50. From the sprocket 49 the chain then returns to its original drive sprocket 44 on the shaft 41.

This completes the general description of the installation with the exception of the particular construction and configuration of the cooperating down-feed belts. As clearly shown in FIGURES 5 and 6 of the drawings, the belts 35 are provided with alternating blunted or truncated lugs or ribs 90 and flat bottomed grooves or troughs 91, simulating the structure of a wide toothed rack or gear element. The belts are trained about the pulley rollers 27, 28, 29 and 30 in such fashion that the ribs and grooves are in staggered relationship along the confronting runs of the belt, as clearly shown in FIGURES 5 and 6. The opposite runs of the belt are brought inwardly toward the center of the arrangement and trained around the pulleys 37 and 38 which are carried by the shafts 39 and 40 which also carry the sprockets 43 and 44.

It will be noted from these later figures that the belts are spaced apart a distance $a$ (see FIGURE 6) which is at least as great as the maximum thickness of a continuous form web W which is to be handled by the machine.

Thus, it will be seen that the webs W are not ironed out by the runs of the belts 35 but are loosely frictionally contacted by the alternately occurring flattened or blunted ribs or lugs 90 which gently urge the web W downwardly toward the receiving shelf.

Sharper toothed lugs would have deleterious effects both in tending to crease or mar flat portions of the web between the opposed zigzag fold lines, and to snag on the fold lines when they happen to coincide therewith. The gentle urging of the web by the means provided herein constitutes one of the virtures of the present development.

It is to be particularly noted that the tent-like crease or fold F, which is generally characterized by a transverse line of perforations, is nested, so to speak, in the particular notch or groove 91a as shown in FIGURE 6, and the advantages of this special feeding arrangement will be emphasized and described in detail after the general operation of the machine has been described.

Now in explaining the operation of this embodiment of the invention, it will be assumed that the parts are in the position shown in FIGURE 1 of the drawings and that an original complete multi-ply pack Pa is to be decollated by the removal of the overlying original record strip leaving the immediately underlying carbon as the remaining top sheet of the multi-ply web, and the other copy sheets and transfer sheets in alternating order through the web. The web is threaded through the guide fork 85 at the right-hand side of the machine as shown in FIGURE 1 and then the top ply or record sheet Sa is bent around the guide roller 50 and if desired threaded into another office machine such as a detacher or refolder. The remaining part of the web Wa (which part is designated Wb) is carried downwardly between the cooperating runs of the feed belts 35. The shelf or tray 60 which in this arrangement is the receiving shelf, is centered beneath the delivery of the down-feed arrangement and the remnant web Wb is piled in zigzag fashion to form the stack Pb.

It will be noted that at the beginning of the run the weight of the pack Pa causes the shelf or tray 61 to take a somewhat lower position than the shelf 60, the parallel arms 65 and 66 angling accordingly and the tension springs 70 occupying an angled position. However, as the pack Pb builds up, the original pack Pa is depleted, and the shelf 60 will gradually lower and the shelf 61 rise. In this original run for decollating a pack topped by an original record sheet, there is no reeling up of a carbon sheet or other transfer sheet required.

However, upon the next run which is designed to decollate or separate the next underlying record sheet, the operation is somewhat different. This arrangement is depicted in FIGURE 2 of the drawing where the pile Pb topped by a carbon sheet occupies the shelf or tray 60. The overlying carbon sheet shown at Ca is brought down and threaded around the prongs of the fork wind-up or reel arrangement 75 at the left-hand side of the device and as the pile Pb becomes depleted the carbon sheet is wound upon the re-wind core for eventual disposal. At the same time the second record sheet Sb is trained around the guide roller 50 as shown in FIGURE 2 and the balance of the multiple web which is now designated Wc. This remnant of the web is then fed downwardly as in the previous case between the runs of the down-feed belts 35 and onto the shelf 61 which, during this operation, has been centered beneath the down-feed arrangement while the opposite shelf 62 was displaced to the left. The pack being built-up on the shelf 61 is designated Pc.

Now, if further separation of the components of the multi-ply web is desired, the shelf or tray-supporting arrangement is again shifted to the right of the machine to occupy the positions shown in FIGURE 1, but in the next operation the next overlying carbon (as suggested at Cb in FIGURE 1) is wound up on the right-hand re-wind reel or core 75 for disposal. It will thus be realized that in all cases except the initial separation of the principal original record sheet, there will be use for the re-wind cores 75 at either end of the machine in order to take care of the overlying carbons. However, it will also be realized that in the down-feed of any remnant webs Wb, etc., the overlying carbon sheet will have its uncoated side outwardly and will not be in a position to smudge or soil the runs of the belt 35.

In FIGURES 7–9 of the drawings there is illustrated another embodiment of the invention in which modified means are provided for removing the topmost strips from a multi-ply web, whether these strips are record sheets or transfer paper. Modified driving means are also provided in this embodiment.

This alternative construction is given the general designation 200 and comprises a pillar structure 201 generally similar in arrangement and function to the structure 12 of the earlier described embodiment. However, the upper portion of the structure is modified in order to accommodate the carbon strip winding or extracting means which is to take the place of those indicated at 75, 76 in the earlier embodiments. For this purpose, both sides of the upper end of the pillar structure 101 are preferably expanded laterally and symmetrically to form the lobes 202 and 203. Mounted in bearings similar to those employed for supporting analogous rotary devices in the earlier embodiment, are the carbon conveying rollers 105 and 106.

Similarly, an off-feed roller 110 is provided which performs a function similar to that of the roller 50 in the earlier described embodiments in delivering the top record sheet to a pile or another operating machine.

The web Wa' as a whole is passed between guide rods 112 which perform a function analogous to that of the guides indicated at 85 in the earlier figures of drawing. These devices are duplicated on the opposite side of the pillar and are given the same numbers with the addition of primes.

The principal operative elements of the machine in this embodiment are of the same construction and operation as those in the earlier described embodiment and will be given the same reference designations; for example, the pile carriers 60 and 61 and the down-feed belt-carrying rollers 27–30 and the belt driving sprockets 37 and 38. The belt is of course, designated by the numeral 35.

As clearly depicted in FIGURE 7, the initial or partly stripped multiple web Wa' feeding from the pile Pa' off the shelf or tray 61 passes between the guides 112. If a record sheet Sb' is uppermost, it is trained over the roller 110 and then led off to a subsequent machine without the necessity of taking a transfer strip or sheet off first. If a transfer sheet Cb' is uppermost, it is taken from the guides 112 and passed in a counterclockwise direction around the roller 105 and then in a clockwise direction around the roller 106 from which it is rapidly moved over the portions of the strip passing around the roller 105 and then downwardly and through a slot in the edge of the bottom of the shelf or tray 61. The bulk of the pile Wb' from which these strips may have been taken then passes through the down-feed arrangement, comprising essentially the notched belt 35, whereupon the remnant web piles up at Pb' on the shelf 60.

Reverse movement of the web from the piles is effected by shifting the trays 60 and 61 to the left, training the portions of the web around the analogous guiding and feeding devices at the left-hand side of FIGURE 7 in a manner similar to the operation of the embodiment shown in FIGURE 2 of the drawings.

The novel driving means for the alternative arrangement is well illustrated in FIGURES 8 and 9 of the drawings. The primary drive shaft analogous to the extended shaft 41 in the earlier embodiment is designated 141 and carries double sprockets 142 and 143 about which are respectively wound the drive chains 150 and 151.

First, tracing the progress of chain 151, it will be noted that it passes around the sprocket 142 of the shaft 141 which activates the belt pulley or sprocket 38 and then it passes over the sprocket 144 of the double sprocket set to the shaft of the opposite belt pulley 37, these two sprockets being designated 144 and 145. Thence the chain 150 passes around an idler sprocket 146 and then around sprockets 147 and 148 carried by the rollers 105' and 106' of the carbon strip delivering means from the left-hand side of FIGURE 7. A sprocket 149 is carried upon the shaft of the record sheet delivery roller 110' and is driven by the chain 150 also. From the sprocket 149 the chain 150 passes around a sprocket 152 which is carried by the shaft of the delivery roller 110, from which point the chain passes back to the sprocket 142.

Drive chain 151 is in mesh with the drive sprocket 143 carried by the drive shaft 141 and passes around the idler sprocket 153 and thence around the two sprockets 154 and 155 carried upon the shafts of the carbon feeding rollers 105 and 106, and there the chain 151 passes around a central idler sprocket 157 and then around the sprocket 145 of the pair which are carried by the shaft of the belt driving roll 37.

From the above, it will be seen that by means of the present invention there has been provided a novel and efficient machine for decollating multiple continuous forms and one which is particularly useful in small establishments. A particular feature of the device is the gentleness by which the web is fed by the corrugated belts. The spacing of the belts and the provision of the staggered teeth or alternating ribs and notches ensure that the continuous multi-ply web is not ironed out flat but is free to retain its general shape and that there is no tight squeeze of the paper web between the belts at any point. This is an essential important point of the present development; the web is carried along in a transversely corrugated condition with the formation of slightly tented areas adjacent the perforated folds, these tents resulting from the previously folded condition in the zigzag packs. This action tends to nest these tents within the notches or recesses in the belt and the lugs of the belt do not tend to iron or smooth back minor differences in sheet length between the component parts of the web, this effecting a feeding action which keeps the fold perforations in register. Most other feeding devices, such as pressure rolls or flat belt surfaces, do iron back the slightly longer parts and this effect tends to be cumulative. That is, if one of the parts happens to be 0.004" longer in an eleven inch form, which is a normal tolerance, then after only twenty-five forms have passed, the longer element will be out of register to the extent of one-tenth of an inch, this resulting in misalignment of the forms and the disruption of the re-fold action.

The device is operative upon single-ply as well as multi-ply webs having quite a large number of superposed elements. It is readily operable upon multi-ply webs containing as many as ten parts and can operate successfully on thicker webs if occasion demands. The machine will process webs of all sizes and weights of paper, and up to the limit in the number of plies, with only a minor adjustment of the side guides to match the form widths. It will handle a complete line of forms products, even when the plies had been fastened together; and this quite readily when fugitive adhesive was used, and also after the fastened margins have been removed in the case of the use of staples, clips, or other separate fastener elements.

The paper feed through the belt mechanism is positive with no slip so that tandem operation with another piece of equipment is feasible if machine speeds are equal.

It will also be realized from the above disclosure that if a pack of forms is off-folded or otherwise out of register, the machine will correct the off-fold or out of register condition. This is important since the off-fold condition can occur after any operation where the forms are fed through a machine and refolded. Subsequent operations are then troublesome unless the off-fold condition is corrected.

It will also be understood that one of the most important advantages accruing from the use of the present invention resides in the fact that the packs do not have to be manually handled between stripping runs. This is important since it retains the desired number sequence (low number on top) of the detached stack of forms without any movement of the pack of forms.

It is understood that various modifications and changes may be made in the embodiments illustrated and described without departing from the scope of the invention as defined by the following claims.

Having thus described the invention, what is claimed as new and desired to be secured by Letters Patent is:

1. A machine for handling paper webs transversely creased in alternate opposite directions, such as continuous business forms foldable to zigzag packs; said machine comprising a main frame carrying a pair of coacting driven endless belts arranged with respective runs confronting each other in slightly spaced parallel relationship, the confronting surfaces of the belts being of blunt truncated toothed configuration alternating with oppositely constructed flat bottomed grooves, similar to those of a rack or gear, the teeth and the grooves between them on the two belts being staggered with respect to each other whereby the teeth of one belt are disposed opposite the grooves of the other belt, the slight spacing of the belts and the blunted nature of the teeth serving to effect gentle frictional feeding of the intervening webs without flattening out the creased fold areas or snagging the webs, and the alternate projecting creased folds of the web nesting in spaces between teeth alternately on the two belts to assist the feeding of the webs and also to maintain register in the case multi-ply webs are fed.

2. A machine for handling paper webs transversely creased in alternate opposite directions, such as continuous business forms foldable to zigzag packs; said machine comprising a main frame carrying a pair of coacting driven endless belts arranged with respective runs confronting each other in slightly spaced parallel relationship, the confronting surfaces of the belts being of toothed configuration similar to that of a rack or gear, the teeth and the spaces between them on the two belts being staggered with respect to each other whereby the teeth of one belt are disposed opposite the spaces of the other belt, the slight spacing of the belts serving to effect gentle frictional feeding of the intervening webs without flattening out the creased fold areas, and the alternate projecting creased folds of the web nesting in spaces between teeth alternately on the two belts to assist the feeding of the webs and also to maintain register in the case multi-ply webs are fed, the common plane of the ends of the teeth of one belt being spaced slightly from the common plane of the ends of the teeth of the other belt, so that the teeth of the respective confronting belt surfaces do not intermesh.

3. A machine for feeding transversely creased paper webs from one zigzag pack to another; said machine comprising a main frame carrying a pair of coacting driven endless belts arranged with respective runs confronting each other in slightly spaced parallel relationship, the confronting surfaces of the belts being of toothed configuration similar to that of a rack or gear, the teeth and the spaces between them on the two belts being staggered with respect to each other whereby the teeth of one belt are disposed opposite the spaces of the other belt, the slight spacing of the belts serving to effect gentle frictional feeding of the intervening webs without flattening out the creased fold areas, and the alternate projecting creased folds of the web nesting in spaces between teeth alternately on the two belts to assist the feeding of the webs and also to maintain register in the case multi-ply webs are fed, the confronting runs of the two webs being substantiallly vertically disposed, means for driving said belts to move the web downwardly between said runs to deposit the fed web in zigzag pack form, a stand supported by said main frame for horizontal movement below said belts, a pair of laterally spaced shelves carried by said stand; movement of the stand in one direction disposing one of said shelves in a receiving position directly beneath the lower ends of the operative runs of said belts, and the other shelf to a feed position to one side of the position of the belts; and movement of the stand in the opposite direction bringing the second named shelf to the receiving position beneath the runs and the first named shelf to a feed position at the opposite side of the belts.

4. A machine for handling paper webs transversely creased in alternate opposite directions, such as continuous business forms foldable to zigzag packs; said machine comprising a main frame; a pair of coating driven endless belts arranged with respective runs disposed vertically in parallel relation centrally of the frame to frictionally feed a web in downward direction; a horizontal bench on said frame beneath said belts and extending laterally somewhat beyond the belts upon both sides thereof; a stand disposed upon said bench and movable horizontally thereon; a pair of laterally spaced shelves on said stand, a selected one of said shelves adapted to be positioned by movement of said stand to a receiving point directly beneath the vertically disposed parallel runs of the belts, while the other spaced shelf is disposed in feed position outward of said belts, whereby a web from said outwardly positioned shelf may be carried upwardly and over one of said belts and downwardly between the belts to the receiving shelf; and whereby the positions may be reversed by the shifting of the stand in the opposite direction to reverse the functions of the shelves.

5. The machine as set forth in claim 4 adapted for decollating a multiple web intermediate its transfer from one of said shelves to the other, and wherein there are provided feeding means adjacent the upper end of the belts for separating and forwarding a record strip from the multiple web before the remnant web is moved downwardly between the belts; and feeding means for separating and discharging a transfer strip from said web.

6. The machine as set forth in claim 5 in which said transfer strip feeding means comprises a pair of driven rollers disposed near the upper end of said belts for frictionally discharging said transfer strip from the machine.

7. The machine as set forth in claim 5 in which said transfer strip feeding means comprises reels for winding said transfer strip from the multi-ply web as it leaves a pack on said feed shelf.

8. The machine as set forth in claim 5 in which the transfer strip feeding means is duplicated on the sides of the machine for use in connection with the removal of transfer strips from either shelf that happens to be in the feed position.

9. A machine as set forth in claim 4 in which spring means are provided counterbalancing the empty shelves on the stand but permitting the receiving shelf to lower relatively to the feed shelf as the transfer of the web from pack to pack proceeds.

10. The machine as set forth in claim 9 in which the shelves are supported from said stand by an upwardly divergent pair of parallel linkages; said spring means comprising a coil tension spring connecting downwardly extended arms of at least one link of each pair; all whereby the shelves are maintained level.

References Cited by the Examiner
UNITED STATES PATENTS

| | | | |
|---|---|---|---|
| 2,050,669 | 8/36 | Puig | 270—39 |
| 2,805,855 | 9/57 | Sornberger | 270—52.5 |

EUGENE R. CAPOZIO, *Primary Examiner.*